United States Patent
Jobi et al.

(10) Patent No.: US 11,675,256 B2
(45) Date of Patent: Jun. 13, 2023

(54) CLOSING MEMBER, ELECTRONIC DEVICE, ELECTRONIC DEVICE FABRICATION METHOD, LIGHT SOURCE UNIT, AND PROJECTOR

(71) Applicant: CASIO COMPUTER CO., LTD., Tokyo (JP)

(72) Inventors: Osamu Jobi, Hachioji (JP); Mitsuo Koyama, Akishima (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 17/406,899

(22) Filed: Aug. 19, 2021

(65) Prior Publication Data
US 2022/0057699 A1  Feb. 24, 2022

(30) Foreign Application Priority Data
Aug. 20, 2020 (JP) .............................. JP2020-139111

(51) Int. Cl.
*G03B 21/20* (2006.01)
(52) U.S. Cl.
CPC .................... *G03B 21/20* (2013.01)
(58) Field of Classification Search
CPC .................................................. G03B 21/20
USPC ....................................................... 353/119
See application file for complete search history.

(56) References Cited

U.S. PATENT DOCUMENTS

| 4,951,834 A | 8/1990 | Aikins | |
| 2014/0218949 A1* | 8/2014 | Chiang | F21V 15/012 |
| | | | 362/487 |

FOREIGN PATENT DOCUMENTS

| CN | 207926806 U | 9/2018 |
| CN | 109521636 A | 3/2019 |
| CN | 209046747 U | 6/2019 |
| JP | 57-208385 A | 12/1982 |
| JP | H07-107583 A | 4/1995 |
| JP | 2013-108942 A | 6/2013 |
| JP | 2019-057522 A | 4/2019 |
| JP | 2019-066625 A | 4/2019 |
| JP | 2020-129144 A | 8/2020 |

OTHER PUBLICATIONS

JPO; Application No. 2020-139111; Notice of Reasons for Refusal dated Jun. 23, 2022.
CNIPA; Application No. 202110949645.X; Office Action dated Mar. 16, 2023.

* cited by examiner

*Primary Examiner* — Jerry L Brooks
(74) *Attorney, Agent, or Firm* — Fitch, Even, Tabin & Flannery LLP

(57) ABSTRACT

An electronic device includes a fixing object member, a case including a fixing target portion that includes a wall portion having a dovetail-shaped engaging target portion and to which the fixing object member is fixed, and a closing member including a dovetail-shaped engagement portion configured to be brought into engagement with the dovetail-shaped engaging target portion and in which an inner circumferential surface thereof is brought into abutment with an outer circumferential surface of the fixing object member and an outer circumferential surface thereof is brought into abutment with an inner circumferential surface of the wall portion.

23 Claims, 11 Drawing Sheets

CLOSING MEMBER, ELECTRONIC DEVICE, ELECTRONIC DEVICE FABRICATION METHOD, LIGHT SOURCE UNIT, AND PROJECTOR

CROSS-REFERENCE TO RELATED APPLICATION

This patent application is based upon the benefit of priority under 35 USC 119 from Japanese Patent Application No. 2020-139111 filed on Aug. 20, 2020, the entire disclosure of which, including the specification, claims, drawings and abstract, is incorporated herein by reference.

BACKGROUND OF THE INVENTION

Field of the Invention

The technical field of the present invention relates to a closing member, an electronic device, an electronic device fabrication method, a light source unit, and a projector.

Description of the Related Art

There have conventionally been disclosed electronic devices such as projectors for projecting images formed by use of a micromirror display device called a digital micromirror device (DMD) or a liquid crystal panel on to a screen. For example, in a projector disclosed by Japanese Patent Laid-Open No. 2019-66625 (JP-A-2019-66625), a fixing object member, which is a holder holding semiconductor light emitting elements and a lens array, is attached to a fixing target portion of a housing via a closing member disposed in an inserting direction of the fixing object member in such a manner as to compress the closing member. As a result, dust is prevented from adhering to the lens array.

SUMMARY OF THE INVENTION

According to an aspect of the present invention, there is provided an electronic device including a fixing object member, a case including a fixing target portion which includes a wall portion having a dovetail-shaped engaging target portion and to which the fixing object member is fixed, and a closing member including a dovetail-shaped engagement portion configured to be brought into engagement with the dovetail-shaped engaging target portion and in which an inner circumferential surface thereof is brought into abutment with an outer circumferential surface of the fixing object member and an outer circumferential surface thereof is brought into abutment with an inner circumferential surface of the wall portion.

DESCRIPTION OF THE EMBODIMENT

Figure 1:
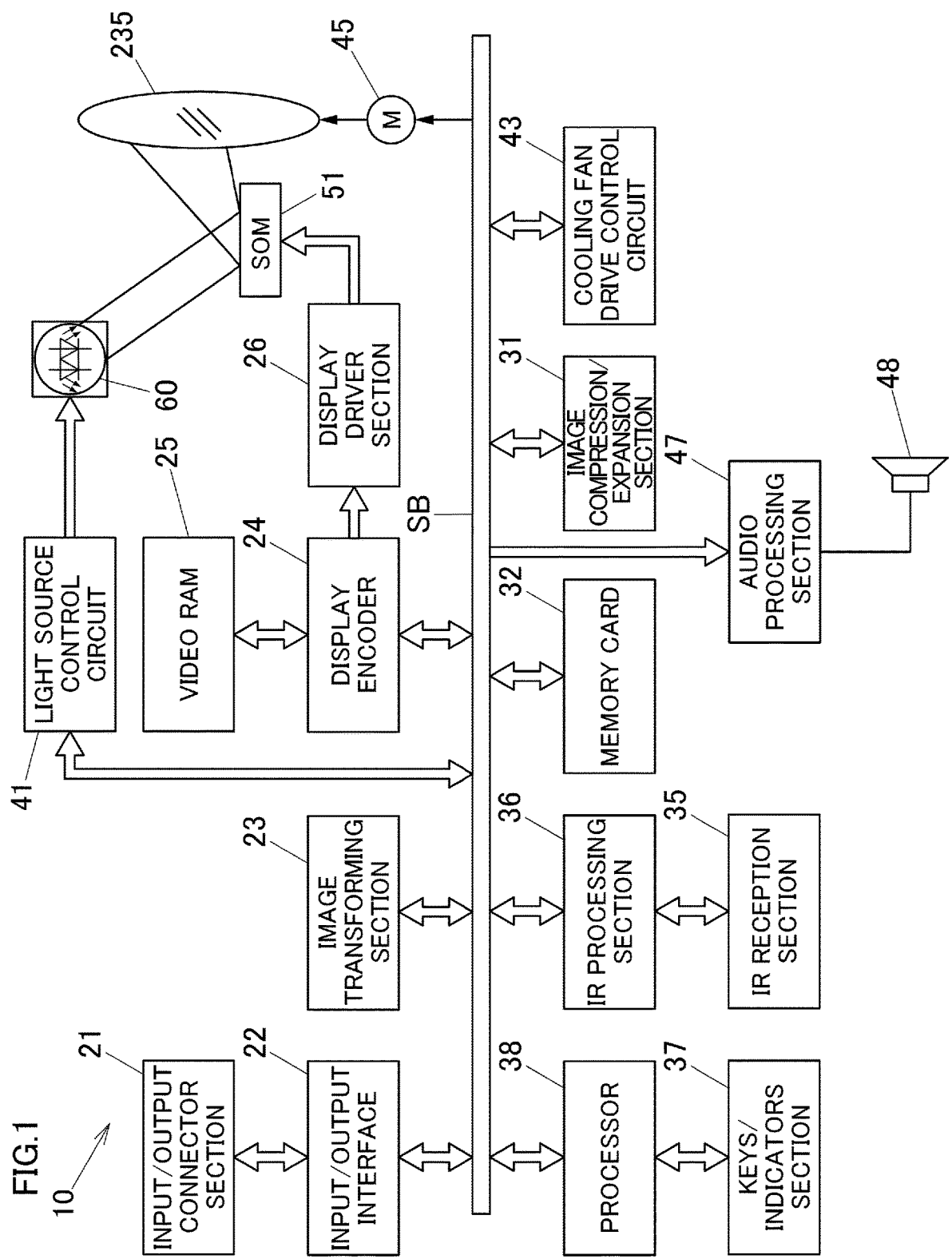
FIG. 1 is a block diagram showing functional circuitries of a projector according to an embodiment of the present invention.

Hereinafter, an embodiment of the present invention will be described. FIG. 1 is a block diagram showing functional circuitries of a projector 10. A projector control unit is made up of CPU including an image transforming section 23 and a processor 38, a front-end unit including an input/output interface 22, and a formatter unit including a display encoder 24 and a display drive section 26. Image signals of various standards which are input from an input/output connector section 21 are sent to the image transforming section 23 via the input/output interface 22 and a system bus SB, and the image signals so sent are then transformed so as to be unified into an image signal of a predetermined format which is suitable for display in the image transforming section 23. Thereafter, the unified image signal of the predetermined format is output to the display encoder 24.

Additionally, the display encoder 24 deploys the image signal input thereinto on a video RAM 25 for storage therein and then generates a video signal from the stored contents of the video RAM 25, outputting the video signal so generated to the display drive section 26.

The display drive section 26 drives a display device 51, which is a spatial optical modulator (SOM), at an appropriate frame rate in response to the image signal output from the display encoder 24. Then, in this projector 10, pencils of light emitted from a light source unit 60 are shined onto the display device 51 via a light guiding optical system, whereby an optical image is formed by the lights reflected by the display device 51, and the image so formed is then projected onto a projection target member such as a screen, not shown, via a projection optical system 220 (refer to FIG. 2) for display on the screen. A movable lens group 235 of the projection optical system 220 can be driven by a lens motor 45 for zooming and focusing.

An image compression/expansion section 31 performs a recording process in which a luminance signal and a color difference signal of the image signal are data compressed through processing such as Adaptive Discrete Cosine Transform (ADCT), Huffman coding and the like, and the compressed data is sequentially written on a memory card 32, which is a detachable recording medium. Further, with the projector 10 set in a reproducing mode, the image compression/expansion section 31 can read out the image data recorded in the memory card 32 and expands the individual image data that makes up a series of dynamic images frame by frame, outputting the image data to the display encoder 24 by way of the image transforming section 23. Thus, the compression/expansion section 31 can output dynamic images or the like based on the image data stored in the memory card 32.

The processor 38 governs the control of operations of individual circuitries inside the projector 10 and is configured of CPU, ROM for fixedly storing operation programs such as various settings or the like, RAM used as a work memory, and the like.

A keys/indicators section 37 is configured of main keys, indicators, and the like which are provided on a housing of the projector 10. Operation signals of the keys/indicators section 37 are sent out directly to the processor 38. Key operation signals from a remote controller are received by an IR reception section 35 and are then demodulated into a code signal in an Ir processing section 36 to be output to the processor 38.

The processor 38 is connected with an audio processing section 47 by way of the system bus SB. The audio processing section 47 includes a circuitry for a sound source such as a PCM sound source or the like. With the projector 10 set in a projection mode and the reproducing mode, the audio processing section 47 converts audio data into analog signals and drives a speaker 48 so as to output sound or voice loudly.

The processor 38 controls a light source control circuit 41. The light source control circuit 41 controls separately a light emitting operation of an excitation light shining device of the light source unit 60 in such a manner that lights in predetermined wavelength ranges required in generating an image are emitted from the light source unit 60.

Further, the processor 38 causes a cooling fan drive control circuit 43 to detect temperatures using multiple temperature sensors which are provided in the light source unit 60 and the like so as to control revolution speeds of cooling fans based on the results of the temperature detections. In addition, the processor 38 also causes the cooling fan drive control circuit 43 to keep the cooling fans revolving by use of a timer or the like even after a power supply to a main body of the projector 10 is switched off. Alternatively, the processor 38 causes the cooling fan drive control circuit 43 to switch off the power supply to the main body of the projector 10 depending upon the results of the temperature detections by the temperature sensors.

Figure 2:
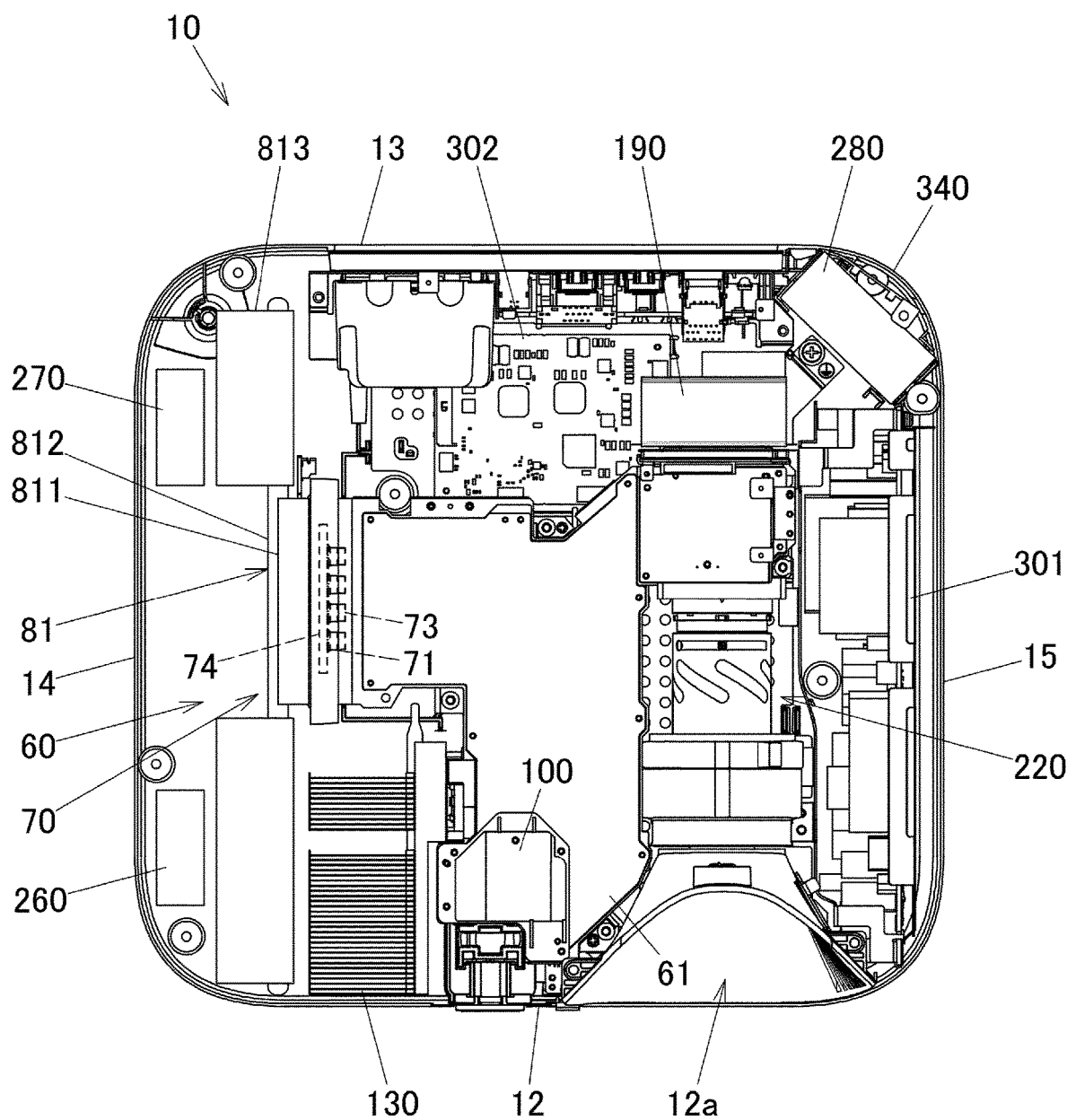
FIG. 2 is a schematic plan view showing an internal structure of the projector according to the embodiment.

Next, an internal structure of the projector 10 will be described. FIG. 2 is a schematic plan view showing the internal structure of the projector 10. Here, the housing of the projector 10 has a substantially box-like shape and includes an upper surface and a lower surface, a front panel 12, a back panel 13, a right panel 14, and a left panel 15. In the following description, when directions are referred to in relation to the projector 10, left and right refer, respectively, to left and right directions with respect to a projecting direction from a projection port 12a, and front and rear refer, respectively, to front and rear directions with respect to a direction of a side of the projector 10 towards a screen and a traveling direction of a pencil of light.

The projector 10 includes a power supply device 301, a control circuit board 302, and the light source unit 60. In addition, the projector 10 includes an air inlet fan 260, an air inlet fan 270, and an air exhaust fan 280.

The light source unit 60 is provided substantially at a center of the housing of the projector 10. The light source unit 60 houses optical members such as light sources, lenses, mirrors, and the like in an interior of the housing by use of a light source case 61. The power supply device 301 is disposed at a side of the light source unit 60 that faces the left panel 15. A circuit board of the power supply device 301 is disposed substantially parallel to the left panel 15. The control circuit board 302 is disposed at a side of the light source unit 60 that faces the back panel 13. The control circuit board 302 is disposed substantially normal to an up-down direction. The control circuit board 302 includes a power supply circuitry block, a light source control block, and the like. In addition, multiple control circuit boards 302 can also be provided separately based on functions such as the power supply circuitry block, the light source control block, and the like.

Figure 3:
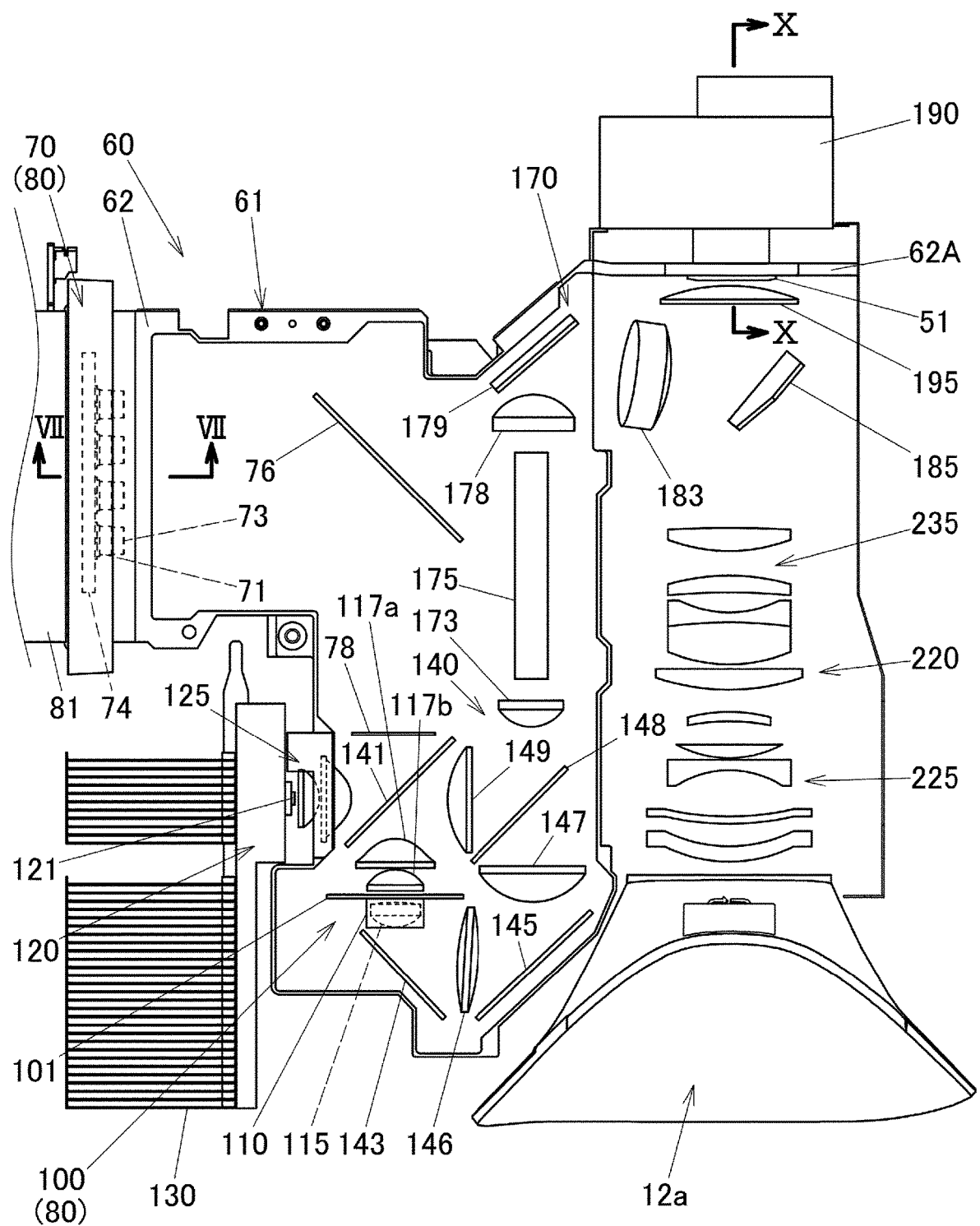
FIG. 3 is a schematic plan view of an interior of a light source case of a light source unit according to the embodiment.

Here, an internal structure of the light source unit 60 will be described. FIG. 3 is a schematic plan view of the light source unit 60. The light source unit 60 includes a red light source device 120, which constitutes a light source for light having a wavelength in the red wavelength range or simply light in the red wavelength range, a green light source device 80, which constitutes a light source for light having a wavelength in the green wavelength range or simply light in the green wavelength range and an excitation light shining device 70, which constitutes not only a light source for light having a wavelength in the blue wavelength range or simply light in the blue wavelength range but also an excitation light source. The green light source device 80 is configured of the excitation light shining device 70 and a luminescent plate device 100. The light source unit 60 includes a light guiding optical system 140. The light guiding optical system 140 is configured to combine a pencil of light in the green wavelength range, a pencil of light in the blue wavelength range, and a pencil of light in the red wavelength range together so as to guide the pencils of light in the green, blue and red wavelength ranges to the same optical path.

The excitation light shining device 70 is disposed at a side of the light source unit 60 that faces the right panel 14 in the housing of the projector 10 (refer to FIG. 2). The excitation light shining device 70 includes multiple semiconductor light emitting elements that are disposed in such a manner that optical axes of the semiconductor light emitting elements become parallel to the back panel 13. In the present embodiment, the multiple semiconductor light emitting devices are multiple blue laser diodes 71 that emit light in the blue wavelength range. In addition, the multiple blue laser diodes 71 are disposed in such a manner as to be aligned parallel to the right panel 14. These multiple laser diodes 71 are fixed to a holding plate (a fixing object member) 74. A total of eight blue laser diodes 71 are provided on the holding plate 74 in such a manner as to be arranged in two rows and four columns.

The excitation light shining device 70 includes a reflection mirror 76, a diffusing plate 78, and a heat sink 81. The reflection mirror 76 changes the direction of an axis of light emitted from each blue laser diode 71 through about 90 degrees towards the diffusing plate 78. The diffusing plate 78 diffuses light that is emitted from each blue laser diode 71 and is then reflected on the reflection mirror 76 at a predetermined diffusing angle. The heat sink 81 is disposed between the blue laser diodes 71 and the right panel 14 (refer to FIG. 2). A collimator lens 73 is attached integrally to each blue laser diodes 71 to convert light emitted from the blue laser diode 71 into parallel light while enhancing the directivity thereof.

The red light source device 120 includes a red light source 121 that is disposed in such a manner that an optical axis thereof becomes parallel to pencils of light emitted from the blue laser diodes 71 and a collective lens group 125 for collecting light emitted from the red light source 121. This red light source 121 is a red light emitting diode that is a semiconductor light emitting element for emitting light in the red wavelength range. The red light source device 120 is disposed in such a manner that an axis of light in the red wavelength range that is emitted from the red light source device 120 intersects an axis of light in the green wavelength range that is emitted from a luminescent plate 101. Additionally, the red light source device 120 includes a heat sink 130, which is disposed at a side of the red light source 121 which faces the right panel 14.

The luminescent plate device 100, which makes up the green light source device 80, includes the luminescent plate 101, a motor 110, collective lenses 117a, 117b, which are disposed on an entrance side, and a collective lens 115, which is disposed on an exit side of the luminescent plate 101. The luminescent plate 101 is a luminescent wheel that is disposed in such a manner as to be at right angles to axes of lights emitted from the excitation light shining device 70. This luminescent plate 101 is driven to rotate by the motor 110. The collective lenses 117a, 117b collect pencils of excitation light emitted from the excitation light shining device 70 onto the luminescent plate 101. The collective lens 115 collects a pencil of light that is emitted from the luminescent plate 101 in the direction of the front panel 12. The luminescent plate device 100 is disposed above the collective lenses 117a, 117b, 115. As a result, a lower portion of the luminescent plate 101 is disposed on optical paths of the collective lenses 117a, 117b, 115.

A luminescent light emitting area and a diffuse transmission area are provided end to end in a circumferential direction on the luminescent plate 101. The luminescent light emitting area receives lights in the blue wavelength range that are emitted from the blue laser diodes 71 as excitation light and emits luminescent light in the green wavelength range that is so excited. The diffuse transmission area diffuse transmits lights emitted from the blue laser diodes 71. The lights so diffuse transmitted are emitted as light in the blue wavelength range of the light source unit 60.

The light guiding optical system 140 includes a first dichroic mirror 141, a collective lens 149, a second dichroic mirror 148, a first reflection mirror 143, a collective lens 146, a second reflection mirror 145, and a collective lens 147. The first dichroic mirror 141 is disposed in a position where light in the blue wavelength range that is emitted from the excitation light shining device 70 and light in the green wavelength range that is emitted from the luminescent plate 101 intersect light in the red wavelength range that is emitted from the red light source device 120. The first dichroic mirror 141 transmits light in the blue wavelength range and light in the red wavelength range and reflects light in the green wavelength range. When light in the green wavelength range is reflected by the first dichroic mirror 141, an axis of the light in the green wavelength range so reflected is changed in direction through 90 degrees in the direction of the left panel 15 towards the collective lens 149. As a result, an axis of light in the red wavelength range that is transmitted through the first dichroic mirror 141 comes to coincide with the axis of the light in the green wavelength range that is reflected by the first dichroic mirror 141.

The collective lens 149 is disposed at a side of the first dichroic mirror 141 that faces the left panel 15. Light in the red wavelength range that is transmitted through the first dichroic mirror 141 and light in the green wavelength range that is reflected by the first dichroic mirror 141 are both incident on the collective lens 149. The second dichroic mirror 148 is disposed at a side of the collective lens 149 that faces the left panel 15 and a side of the collective lens 147 that faces the back panel 13. The second dichroic mirror 148 reflects light in the red wavelength range and light in the green wavelength range and transmits light in the blue wavelength range. As a result, light in the red wavelength range and light in the green wavelength range that are collected at the collective lens 149 are reflected by the second dichroic mirror 148, whereby the directions of the lights are changed through 90 degrees towards the back panel 13. A collective lens 173 is disposed at a side of the second dichroic mirror 148 that faces the back panel 13. Light in the red wavelength range and light in the green wavelength range that are reflected by the second dichroic mirror 148 are incident on the collective lens 173.

The first reflection mirror 143 is disposed on an axis of light in the blue wavelength range that is transmitted through the luminescent plate 101, that is, between the collective lens 115 and the front panel 12. The first reflection mirror 143 reflects light in the blue wavelength range and changes the direction of an axis of the light in the blue wavelength range through 90 degrees towards the direction of the left panel 15. The collective lens 146 is disposed at a side of the first reflection mirror 143 that faces the left panel 115. In addition, the second reflection mirror 145 is disposed at a side of the collective lens 146 that faces the left panel 15. The second reflection mirror 145 changes the direction of an axis of light in the blue wavelength range that is reflected by the first reflection mirror 143 and is then collected by the collective lens 146 through 90 degrees towards the back panel 13. The collective lens 147 is disposed at a side of the second reflection mirror 145 that faces the back panel 13. Light in the blue wavelength range that is reflected by the second reflection mirror 145 is transmitted through the second dichroic mirror 148 by way of the collective lens 147 and is then incident on the collective lens 173. Thus, pencils of light in the red, green, and blue wavelength ranges that are guided by the light guiding optical system 140 are guided onto the same optical path of a light source side optical system 170.

The light source side optical system 170 includes the collective lens 173, a light guiding device 175 such as a light tunnel, a glass rod, or the like, a collective lens 178, a light axis changing mirror 179, a collective lens 183, a shining mirror 185, and a condenser lens 195. The condenser lens 195 emits image light emitted from the display device 51, which is disposed at a side of the condenser lens 195 that faces the back panel 13, towards the projection optical system 220, and therefore, the condenser lens 195 also constitutes a part of the projection optical system 220.

Pencils of light emerging from the collective lens 173 are incident on the light guiding device 175. Pencils of light that are incident on the light guiding device 175 are each converted into a pencil of light whose intensity is more uniformly distributed by the light guiding device 175.

The light axis changing mirror 179 is disposed on an optical axis of the light guiding device 175 on a side thereof that faces the back panel 13 via the collective lens 178. A pencil of light that emerges from an exit port of the light guiding device 175 is collected at the collective lens 178, and thereafter, an axis of the pencil of light is changed to be directed towards the collective lens 183 by the light axis changing mirror 179.

The pencil of light, which is reflected by the light axis changing mirror 179, is collected by the collective lens 183 and is then shined onto the display device 51 at a predetermined angle by way of the condenser lens 195 by the shining mirror 185. A heat sink 190 is provided at a side of the display device 51 that faces the back panel 13. The display device 51, which is the digital micromirror device (DMD), is cooled by this heat sink 190.

The pencil of light, which is light source light shined onto an image forming plane of the display device 51 by the light source side optical system 170, is reflected on the image forming plane of the display device 51 and is projected onto a screen by way of the projection optical system 220 as projected light.

The projection optical system 220 is configured of the condenser lens 195, the movable lens group 235, and a fixed lens group 225. The fixed lens group 225 is incorporated in a fixed lens barrel. The movable lens group 235 is incorporated in a movable lens barrel and is moved manually or automatically for zooming and focusing.

With the projector 10 that is configured as has been described heretofore, when the luminescent plate 101 is rotated, and lights are emitted from the excitation light shining device 70 and the red light source device 120 at different timings, lights in the red, green and blue wavelength ranges are incident on the light guiding device 175 by way of the light guiding optical system 140 and are further incident on the display device 51 by way of the light source side optical system 170. As a result, the digital micromirror device (DMD), which constitutes the display device 51 of the projector 10, displays red, green and blue lights in a time sharing fashion, whereby a color image can be projected from the projection port 12a.

Figure 4:
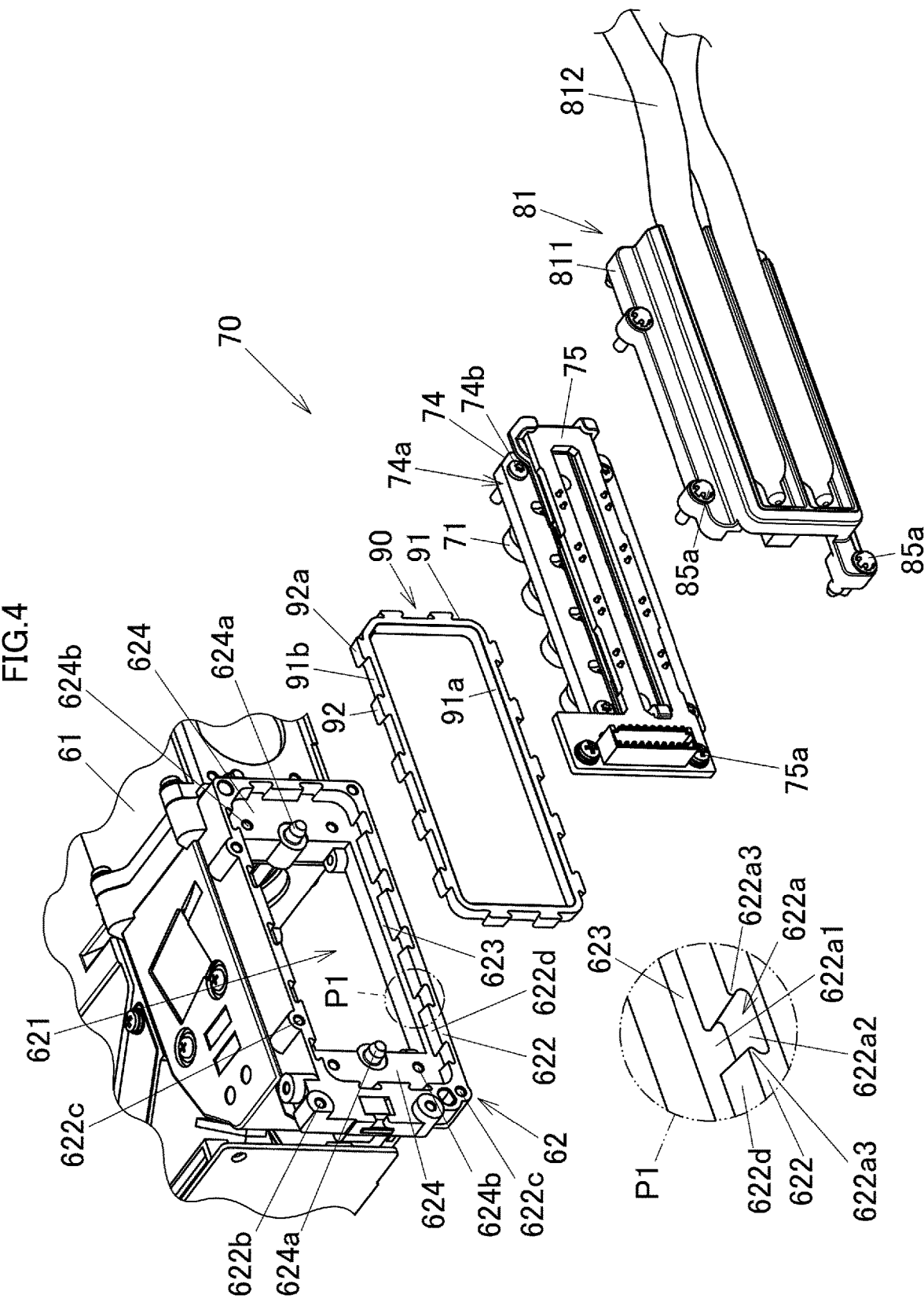
FIG. 4 is an exploded perspective view showing a state in which an excitation light shining device is attached to a fixing target portion according to the embodiment.

Next, referring to FIGS. 4 to 8, an attaching structure of the excitation light shining device 70 to the light source case 61 will be described in detail. FIG. 4 is an exploded perspective view showing a fixing target portion 62 of the light source case 61, which constitutes a fixing position where the excitation light shining device 70 is attached, and the excitation light shining device 70. The fixing target portion 62 of the light source case 61 includes an opening portion 621 and an annular wall portion 622, which is provided around the opening portion 621. The opening portion 621 and the annular wall portion 622 have a substantially elongated rectangular shape that is elongated in a horizontal direction.

As shown in an enlarged view of a portion denoted by P1 in FIG. 4, too, an inside of the annular wall portion 622 is formed into a step-like configuration, whereby a packing restriction portion 623 in the form of a annular surface is formed. On the other hand, a sitting abutment portion 624 is formed at each of both shorter sides of the annular wall portion 622, and this sitting abutment portion 624 is formed into a flat surface continuing to the packing restriction portion 623. A boss 624a is provided on each sitting abutment portion 624 in such a manner as to rise from the sitting abutment portion 624. A front surface (a side surface 74c), which faces the sitting abutment portions 624, of the holding plate 74, which will be described, is brought into abutment with the sitting abutment portions 624 to be positioned, and the bosses 624a are inserted into corresponding long hole portions of the holding plate 74, which will be described later (refer to FIG. 8).

Figure 5:
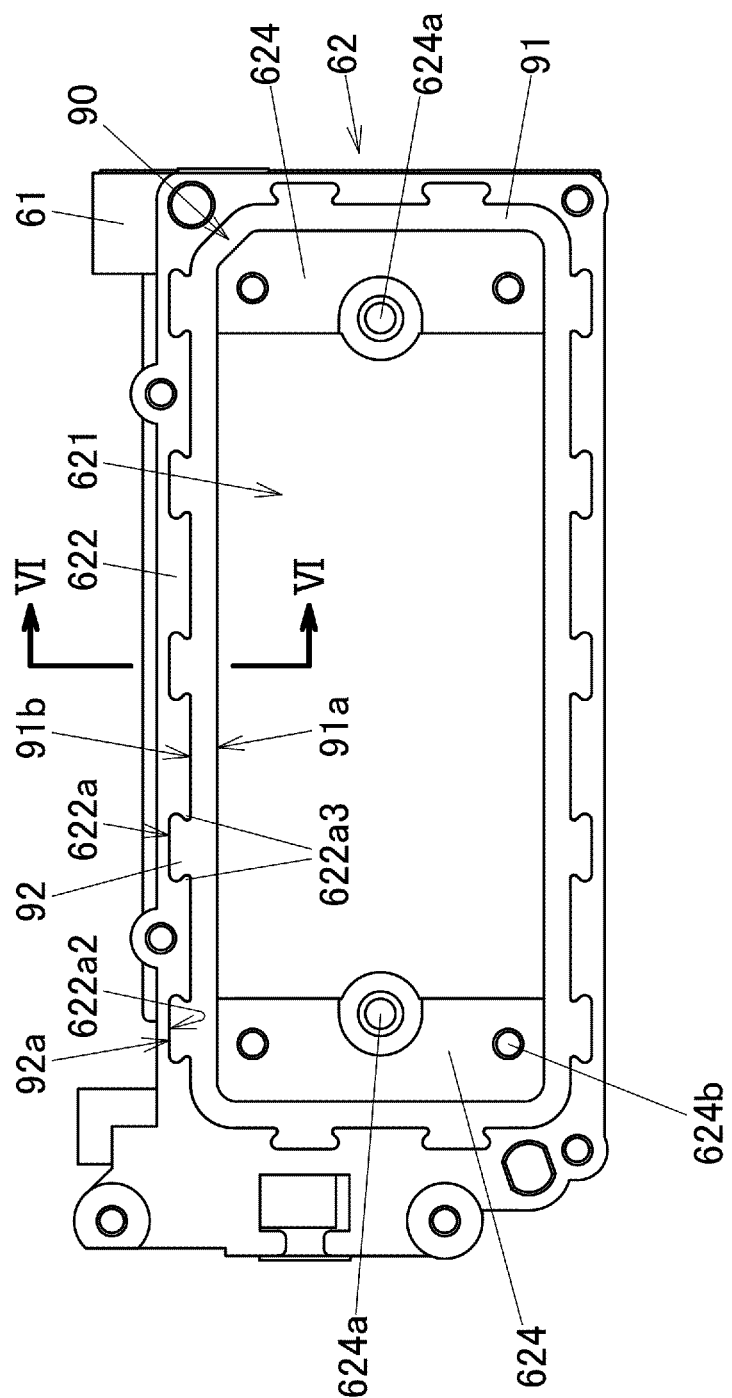
FIG. 5 is a front view, as seen from a center axis direction of a packing, showing a state in which the packing is attached to a fixing target portion according to the embodiment.

As shown in the enlarged view of the portion P1 in FIG. 4 and FIG. 5, multiple dovetail-shaped engaging target portions 622a are formed in the annular wall portion 622. In the present embodiment, the dovetail-shaped engaging target portions 622a are each formed into a groove-like configuration to act as a female joint element in a dovetail joint. A bottom surface 622a1 of the dovetail-shaped engaging target portion 622a is formed on a side of the dovetail-shaped engaging target portion 622a which faces an interior of the light source case 61. Here, the bottom surface 622a1, the packing restriction portion 623, and the sitting abutment portion 624 are formed into a continuous flat plane. Five dovetail-shaped engaging target portions 622a are provided on each of both longer sides of the annular wall portion 622, and two dovetail-shaped engaging target portions 622a are provided on each of the shorter sides of the annular wall portion 622. As a result, there are provided a total of 14 dovetail-shaped engaging target portions.

In addition, screw thread holes 624b are provided at two locations on each of the sitting abutment portions 624 of the fixing target portion 62. Bolts 74b of the holding plate 74 are screwed into the corresponding screw thread holes 624b, whereby the holding plate 74 is fixed to the fixing target portion 62. Additionally, screw thread holes 622b are provided at two locations outside one (a left-hand side in FIG. 4) of the shorter sides of the annular wall portion 622 to fix a circuit board 75, which will be described later, to the annular wall portion 62 by allowing two bolts 75a of the circuit board 75 to be screwed into the corresponding screw thread holes 622b. Further, screw thread holes 622c are provided at four locations in total along an outer circumference of the longer side and in corner portions of the annular wall portion 622 to allow bolts 85a for fixing the heat sink 81, which will be described later, to be screwed into the corresponding screw thread holes 622c.

Figure 6:
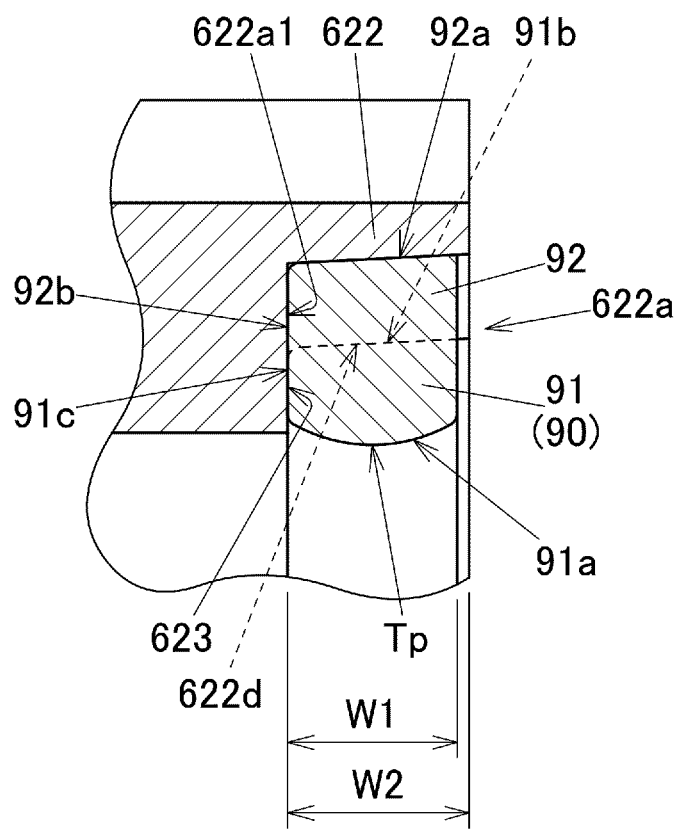
FIG. 6 is a cross-sectional view taken along a line VI-VI shown in FIG. 5 which shows the fixing target portion and the packing according to the embodiment.

The excitation light shining device 70 includes a packing 90 (a closing member). As shown in FIGS. 5 and 6, the packing 90 has an annular packing main body 91 having a substantially elongated rectangular shape that is elongated in the horizontal direction as with the opening portion 621 and the annular wall portion 622 of the fixing target portion 62. Multiple dovetail-shaped engagement portions 92 are formed on an outer circumferential surface 91b of the packing main body 91. In the present embodiment, the dovetail-shaped engagement portions 92 are each formed into a projection protruding from the outer circumferential surface 91b so as to act as a male joint element in a dovetail joint. As shown in FIG. 6, the packing 90 (the packing main body 91 and the dovetail-shaped engagement portions 92) is formed to have a predetermined width W1. The width W1 of the packing 90 is made smaller than a width W2 of the annular wall portion 622 (an inner circumferential surface 622d). As a result, the holding plate 74 does not compress the packing 90 in its inserting direction and hence receives no repulsive force from the packing 90. An inner circumferential surface 91a of the packing main body 91 is formed to have an arc-shaped cross section.

The dovetail-shaped engagement portions 92 of the packing 90 are formed the same number as the dovetail-shaped engaging target portions 622a of the fixing target portion 62 and are brought into engagement with these dovetail-shaped engaging target portions 622a. The dovetail-shaped engaging target portions 622a and the dovetail-shaped engagement portions 92 are formed to have substantially the same internal and external configurations, whereby the dovetail-shaped engagement portions 92 can be fitted in the corresponding dovetail-shaped engaging target portions 622a.

Specifically speaking, the dovetail-shaped engagement portions 92 and the dovetail-shaped engaging target portions 622a are formed into such a shape that in a front view in FIG. 5, they expand gradually from a proximal end portion, corner portions are each formed into an angularly rounded shape, and expanded ends are connected by a flat surface.

Figure 7:
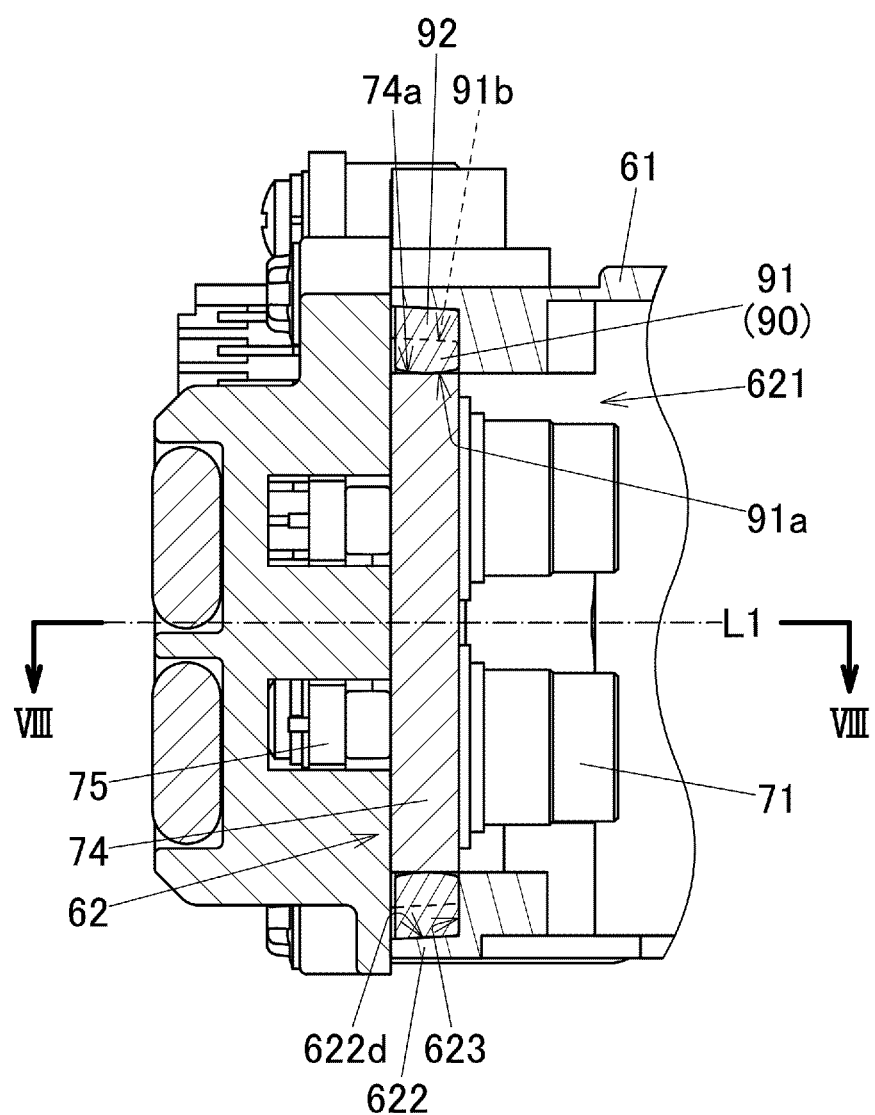
FIG. 7 is a cross-sectional view taken along a line VII-VII shown in FIG. 3 which shows a state in which the excitation light shining device is attached to the fixing target portion according to the embodiment.
Figure 8:
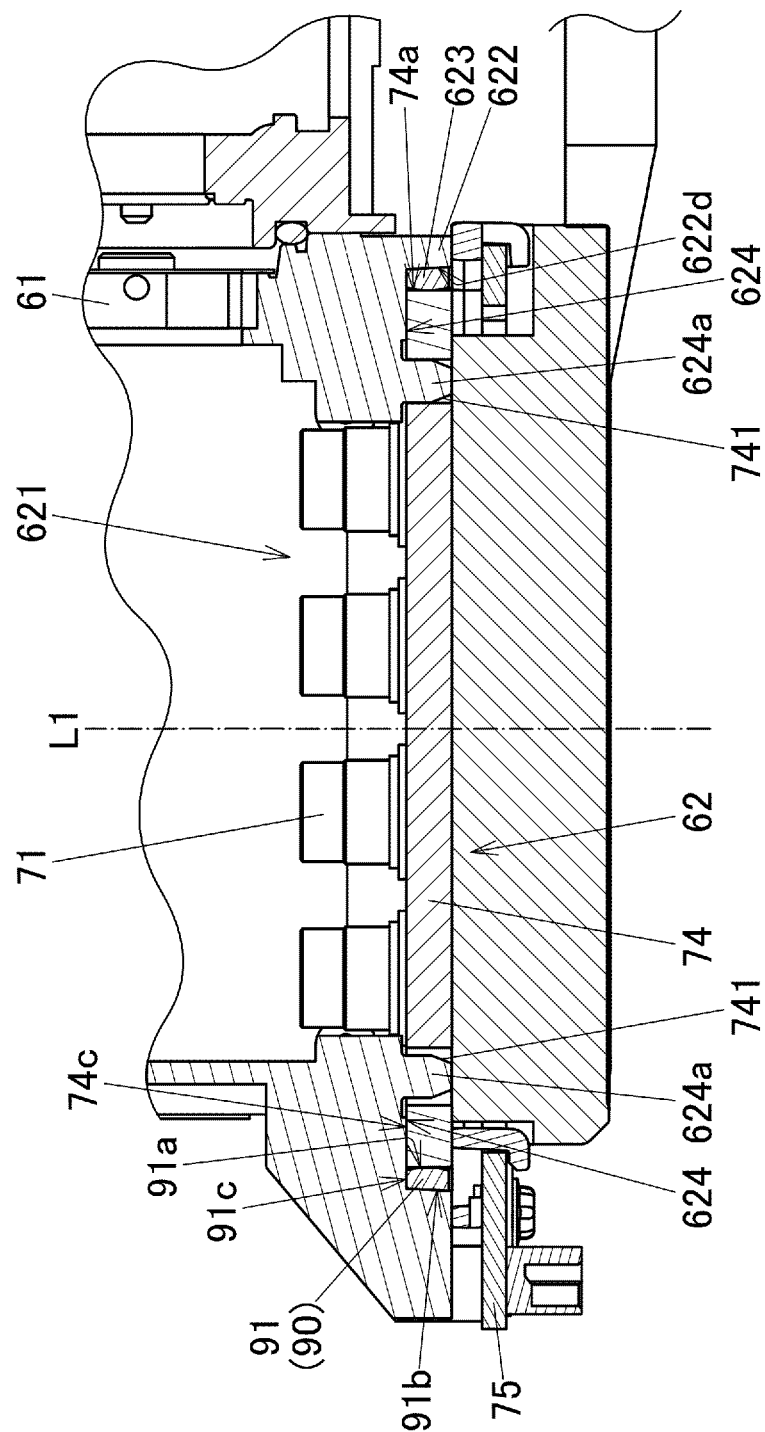
FIG. 8 is a cross-sectional view taken along a line VIII-VIII shown in FIG. 7 which shows a state in which the excitation light shining device is attached to the fixing target portion according to the embodiment.

As shown in FIGS. 7 and 8, the packing 90 is disposed between an outer circumferential surface 74a of the holding plate 74 and the inner circumferential surface 622d of the annular wall portion 622. As this occurs, the outer circumferential surface 74a of the holding plate 74 is brought into abutment with the inner circumferential surface 91a of the packing main body 91 of the packing 90 and is caused to firmly stick to the inner circumferential surface 91a, while the outer circumferential surface 91b of the packing main body 91 is brought into abutment with the inner circumferential surface 622d of the annular wall portion 622 and is caused to firmly stick to the inner circumferential surface 622d. The packing main body 91 receives a force in a direction normal to the optical axis of the excitation light shining device 70 from the outer circumferential surface 74a of the holding plate 74 to thereby be compressed. The dovetail-shaped engagement portion 92 is tightened at the proximal end portion (a neck portion) thereof by projecting portions 622a3 of the dovetail-shaped engaging target portion 622a that opens on a side that faces the inner circumferential surface 622d. The holding plate 74 is sealed around its circumference by compressing the packing 90 radially outwards from the inner circumferential surface 91a thereof by the holding plate 74 in the way described above.

In addition, as shown in FIG. 6, a side surface 91 of the packing main body 91 that faces the light source case 61 is brought into abutment with the packing restriction portion 623 of the fixing target portion 62. A side surface 92b of the dovetail-shaped engagement portion 92 that faces the light source case 61 is brought into abutment with the bottom surface 622a1 of the dovetail-shaped engaging target portion 622a. The packing 90 is restricted from moving towards the light source case 61 by the packing restriction portion 623 and the bottom surface 622a1.

The packing 90 is integrally molded using a silicone rubber. A taper for facilitating a removal of the packing 90, that is, a removal taper is imparted to the outer circumferential surface (91b, 92a) of the packing 90. Additionally, the inner circumferential surface 622d and the dovetail-shaped engaging target portions 622a of the annular wall portion 622 are also tapered so as to match the removal taper of the outer circumferential surface of the packing 90.

In addition, as shown in FIG. 8, elongated hole portions 741 are formed in the holding plate 74 on which the blue laser diodes 71 are mounted, so that the bosses 624a on the sitting abutment portions 624 of the fixing target portion 62 are inserted to be loosely fitted therein. The elongated hole portion 741 is an elongated hole that is slightly longer in the horizontal direction than a diameter or thickness of the boss 624a. As shown in FIGS. 7 and 8, the circuit board 75 is provided on a back side of the holding plate 74 for connection with lead wires of the blue laser diodes 71. The circuit board 75 is formed into a substantially annular shape, and a connector connecting portion is provided at one end of the circuit board 75. A base member 811 of the heat sink 81 is provided on a back side of the circuit board 75 (the holding plate 74). A heat pipe 812 is connected to the base member 811. The heat pipe 812 is connected with a heat sink main body 813 (refer to FIG. 2). The base member 811 of the heat sink 81 is connected to a back surface of the holding plate 74 while avoiding an interference with the circuit board 75 so as to transmit heat generated from the blue laser diodes 71 to the heat sink main body 813.

The excitation light shining device 70 is attached to the fixing target portion 62 of the light source case 61 using the following fabrication method.

First Step: The dovetail-shaped engagement portions 92 of the packing 90 are fitted in the corresponding dovetail-shaped engaging target portions 622a of the fixing target portion 62 for engagement therewith, and the packing 90 is attached to the fixing target portion 62. The packing 90 is lightly pushed in towards the light source case 61 until the side surfaces (the side surfaces 91c, 92b) on the side facing the light source case 61 comes into abutment with the packing restriction portion 623 and the bottom surface 622a1, respectively.

Second Step: The holding plate 74, to which the blue laser diodes 71 and the circuit board 75 are attached, is attached to the fixing target portion 62. To attach the holding plate 74 to the fixing target portion 62, the bosses 624a are inserted into the corresponding elongated hole portions 741 in the holding plate 74, and the holding plate 74 is pushed in so that the outer circumferential surface 74a of the holding plate 74 comes into contact with the inner circumferential surface 91a of the packing 90 (the packing main body 91). The holding plate 74 continues to be pushed in until the sitting abutment portions 624 come into abutment with the corresponding front surface (the side surface 74c) on the side of the holding plate 74 that faces the light source case 61 (in other words, the side surface 74c on the side of the holding plate 74 where lights are emitted from the blue laser diodes 71). Then, the bolts 74b are screwed into the corresponding screw thread holes 624b after the holding plate 74 has come into abutment with the sitting abutment portions 624 whereby the holding plate 74 is positioned with respect to the inserting direction of the holding plate 74 (the optical axis direction of the excitation light shining device 70 or blue laser diodes 71), and the holding plate 74 is fixed to the fixing target portion 62 by screwing the bolts 74b into the corresponding screw thread holes 624b. Similarly, the circuit board 75 is fixed in place by screwing the bolts 75a into the corresponding screw thread holes 622b.

Third Step: The base member 811 is attached to the back side of the holding plate 74 by screwing the bolts 85a of the heat sink 81 into the corresponding screw thread holes 622c.

The packing 90 for the excitation light shining device 70 that is attached in the way described above is compressed as a result of the outer circumferential surface 74a of the holding plate 74 pressing against the inner circumferential surface 91a of the packing 90. The packing 90 is compressed at the proximal end portions (the neck portions) of the dovetail-shaped engagement portions 92 at the engagement portions where the dovetail-shaped engagement portions 92 are brought into engagement with the corresponding dovetail-shaped engaging target portions 622a. The outer circumferential surface 91b of the packing main body 91 is brought into abutment with the inner circumferential surface 622d of the annular wall portion 622 and is caused to firmly stick to the inner circumferential surface 622d. Consequently, the interior side (the side where lights are emitted from the blue laser diodes 71) of the holding plate 74 is closed tightly.

Then, the dovetail-shaped engagement portions 92 are brought into engagement with the corresponding dovetail-shaped engaging target portions 622a through the dovetail joint, that is, the projecting portions 622a3 of the dovetail-shaped engaging target portions 622a hold the neck portions of the dovetail-shaped engagement portions 92 in such a manner as to tighten them, whereby even though the holding plate 74 is inserted while being caused to press against the inner circumferential surface 91*a* of the packing 90, the occurrence of torsion in the packing 90 is reduced. Then, in attaching the holding plate 74 to the fixing target portion 62, since the holding plate 74 is positioned by bringing the front surface (the side surface 74*c*) thereof into abutment with the sitting abutment portions 624 without compressing the packing 90 in the inserting direction of the holding plate 74 (the optical axis direction of the blue laser diodes 71), which is the direction of a center axis L1 of the packing 90, the assembling accuracy of the holding plate 74 in the optical axis direction can be improved.

In addition, since the inner circumferential surface 91*a* of the packing 90 is formed to have the arc-shaped cross section, that is, the projecting arc-shaped cross section, also, in the step (the second step) of inserting the holding plate 74 while pressing the inner circumferential surface 91*a* by the outer circumferential surface 74*a* of the holding plate 74, the outer circumferential surface 74*a* of the holding plate 74 gradually presses on the inner circumferential surface 91*a*, whereby the occurrence in torsion or the like in the packing 90 can be reduced further.

Since a pressure on the inner circumferential surface 91*a* can be made to reach its maximum at a timing close to a timing at which the holding plate 74 and the sitting abutment portions 624 are brought into abutment with each other by setting the position of a top portion Tp, having an arc-shaped cross section, of the inner circumferential surface 91*a* of the packing 90 shown in FIG. 6 inside the light source case 61, the occurrence of torsion or the like in the packing 90 can preferably be reduced further more.

The configuration of the inner circumferential surface 91*a*, having the arc-shaped cross section, of the packing 90 is not limited to that described in the embodiment. Hence, for example, a configuration may be adopted in which an abutment projection is formed on a flat inner circumferential surface 91*a* in such a manner as to protrude therefrom into a projection (for example, a semi-spherical projection) so as to be brought into abutment with the outer circumferential surface 74*a* of the holding plate 74. In addition, the inner circumferential surface 91*a* may be formed to have an angular cross section.

Figure 9:
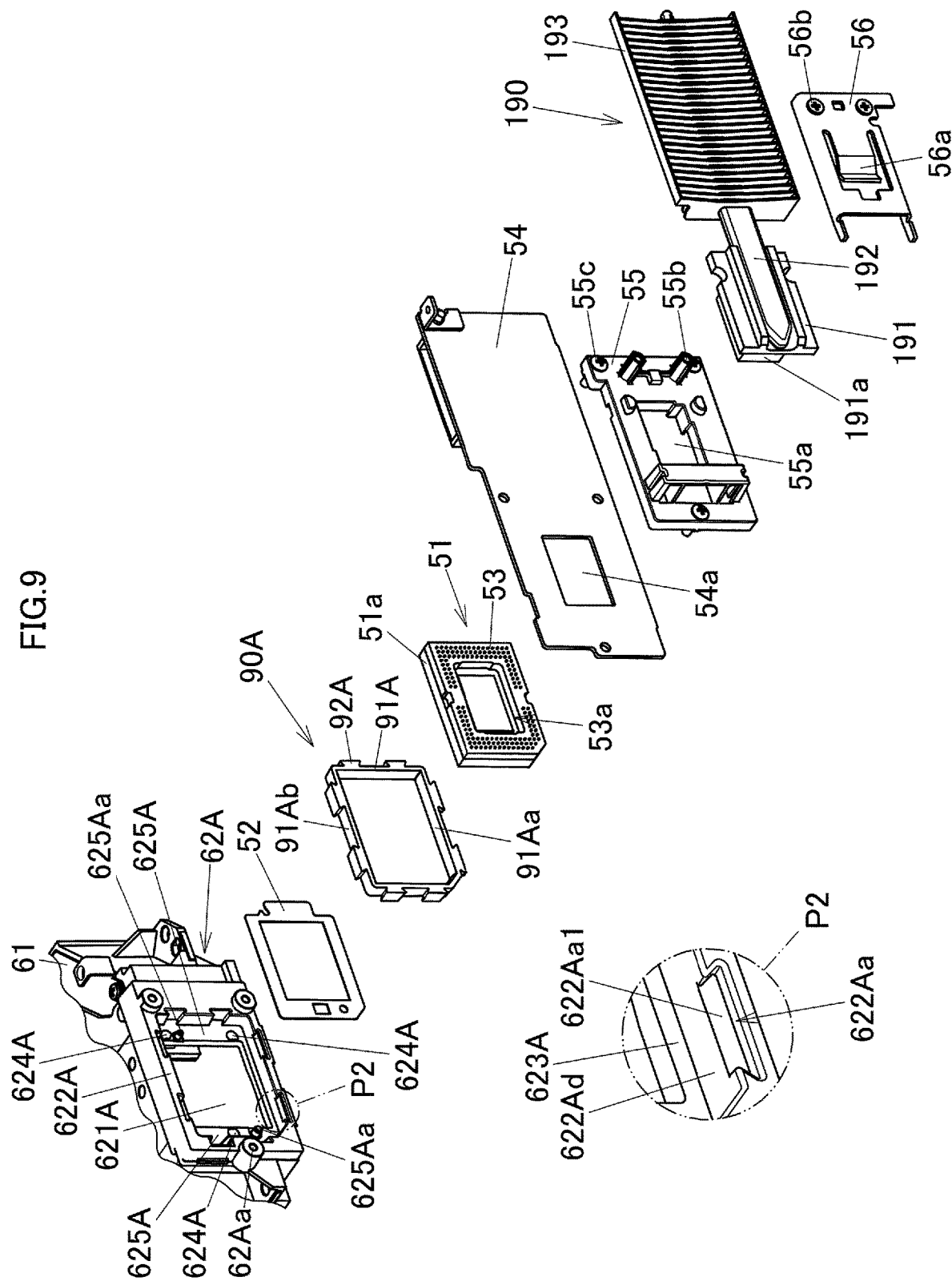
FIG. 9 is an exploded perspective view showing a state in which a display device is attached to a fixing target portion according to the embodiment.
Figure 10:
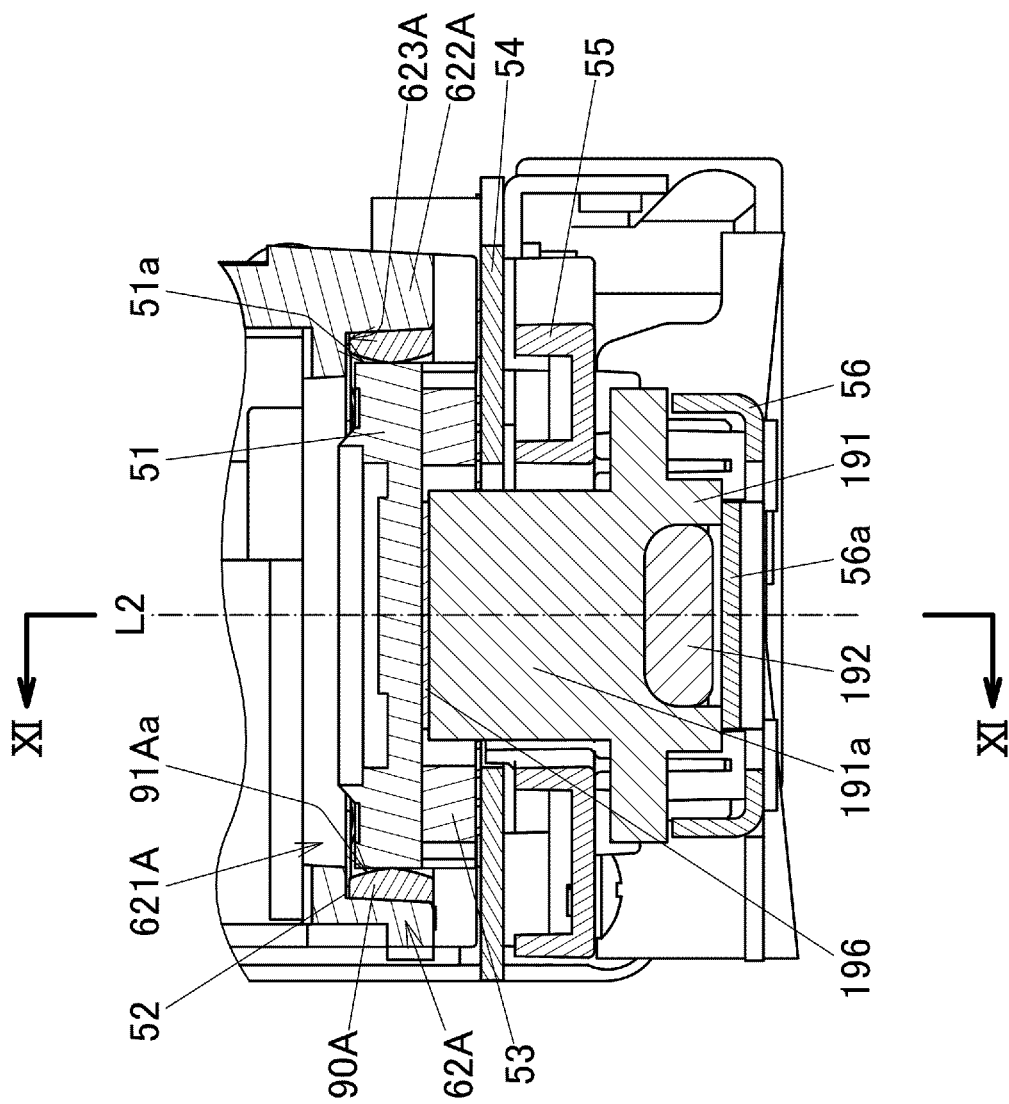
FIG. 10 is a cross-sectional view taken along a line X-X shown in FIG. 3 which shows a state in which the display device is attached to the fixing target portion according to the embodiment.
Figure 11:
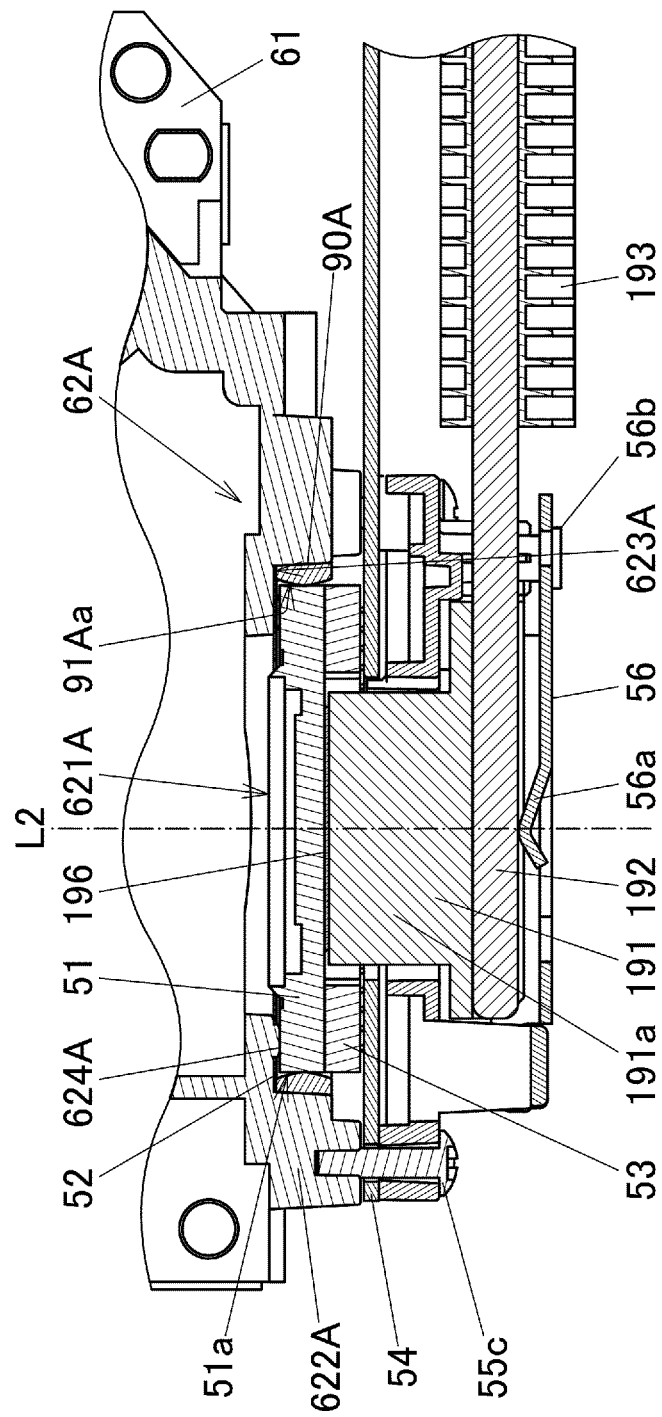
FIG. 11 is a cross-sectional view taken along a line XI-XI shown in FIG. 10 which shows a state in which the display device is attached to the fixing target portion according to the embodiment.

Next, referring to FIGS. 9 to 11, an attaching structure of the display device 51 (a fixing object member) to a fixing target portion 62A of the light source case 61 will be described in detail. A substantially elongated rectangular opening portion 621A, which is elongated in a horizontal direction, is formed in the fixing target portion 62A. An annular wall portion 622A is formed around the opening portion 621A. A step-like annular packing restriction portion 623A is formed inside the annular wall portion 622A. A seat forming plane 625A having a sitting abutment portion 624A is formed inside each of shorter sides of the annular wall portion 622A. The seat forming plane 625A constitutes a flat plane that continues to the packing restriction portion 623A. Three sitting abutment portions 624A are formed on the seat forming planes 625A (as seen from a side facing the display device 51 in FIG. 9, two on a right-hand side seat forming plane, and one on a left-hand side seat forming plane). In addition, a boss 625Aa is formed on each seat forming plane 625A to guide a position in a direction normal to the optical axis of the display device 51.

Groove-like Dovetail-shaped engaging target portions 622Aa are formed in the annular wall portion 622A to act as a female joint element in a dovetail joint. Two dovetail-shaped engaging target portions 622Aa are formed in each side of the substantially elongated rectangular annular wall portion 622A, and thus, in total, eight dovetail-shaped engaging target portions 622Aa are formed in the annular wall portion 622A. Each dovetail-shaped engaging target portion 622Aa includes a bottom surface 622Aa1. Except two lower dovetail-shaped engaging target portions 622Aa in FIG. 9, bottom surfaces 622Aa1 of the other dovetail-shaped engaging target portions 622Aa are formed on the same plane that continues to the packing restriction portion 623A. As shown in an enlarged view of a portion P2 in FIG. 9, the two lower dovetail-shaped engaging target portions 622Aa in FIG. 9 are formed into a groove that is shallower than those of the other dovetail-shaped engaging target portions 622Aa.

A packing 90A (a closing member) is attached to the fixing target portion 62A via a shielding plate 52. As with the packing 90 for the excitation light shining device 70, the packing 90A includes a substantially elongated rectangular annular packing main body 91A and dovetail-shaped engagement portions 92A. An inner circumferential surface 91Aa of the packing 91A has an arc-shaped cross section. The shielding plate 52 has an annular configuration including an elongated rectangular opening portion formed therein, and hole portions are formed therein to allow the sitting abutment portions 624A and the bosses 625Aa to be exposed therefrom.

The inner circumferential surface 91Aa of the packing 90A is brought into abutment with an outer circumferential surface 51*a* of the display device 51 and is caused to firmly stick to the outer circumferential surface 51*a*. The display device 51 is positioned in an optical axis direction thereof as a result of surfaces of corresponding portions on a side of the display device 51 that faces the light source case 61 (a surface where micromirror elements of the display device 51, which is made up of the digital micromirror device (DMD), are disposed) being brought into abutment with the sitting abutment portions 624A. In addition, the display device 51 has hole portions (not shown) that are formed therein as required so that the bosses 625Aa are loosely fitted in. A substantially rectangular annular socket 53 is attached to a back surface of the display device 51.

A circuit board 54 and a base fixing member 55 are provided on the back surface of the display device 51. On the other hand, the heat sink 190 includes a base member 191 and a heat pipe 192 for connecting the base member 191 and a heat sink main body 193 together. A rectangular projecting portion 191*a* is formed on the base member 191. A distal end portion of the projecting portion 191*a* of the base member 191 penetrates a hole portion 55*a* of the base fixing member 55, a hole portion 54*a* of the circuit board 54, and a hole portion 53*a* of the socket 53 and is then brought into abutment with the display device 51 via a heat conducting member 196 (refer to FIGS. 10 and 11). The heat conducting member 196 is formed of a low-hardness clay-like material that is made mainly of silicon. Heat from the display device 51 is emitted from the heat sink main body 193 by way of the heat conducting member 196, the base member 191 (the projecting portion 191*a*), and the heat pipe 192.

Then, a pressing member 56 is fixedly provided on the base fixing member 55. A leaf spring portion 56*a* is formed on the pressing member 56. The leaf spring portion 56*a* presses on the base member 191 from a back thereof. The display device 51 is pressed towards the light source case 61 as a result of the base member 191 being pressed from the back thereof, whereby the display device 51 is positioned to be fixed in the optical axis direction.

The pressing member 56 is fixed in place by screwing two bolts 56b into corresponding screw thread holes 55b in the base fixing member 55. The base fixing member 55 is fixed in place by screwing three bolts 55c into corresponding screw thread holes 62Aa in the light source case 61.

The packing 90A and the display device 51 are also attached to the fixing target portion 62A in a similar manner to that in which the excitation light shining device 70 is attached to the fixing target portion 62. Firstly, the dovetail-shaped engagement portions 92A of the packing 90A are brought into engagement with the corresponding dovetail-shaped engaging target portions 622Aa, whereby the packing 90A is attached to the fixing target portion 62A. As this occurs, the packing 90A is attached to the fixing target portion 62A in such a manner as to hold the shielding plate 52 between the fixing target portion 62A and the packing 90A. As a result, the shielding plate 52 is held by the packing 90A. The packing 90A is restricted from moving towards the light source case 61 by the packing restriction case 623A via the shielding plate 52.

After the packing 90A is attached to the fixing target portion 62A, the display device 51 is inserted in the optical axis direction towards the light source case 61 while bringing the outer circumferential surface 51a of the display device 51 into abutment with the inner circumferential surface 91Aa of the packing 90A so as to cause the outer circumferential surface 51a to firmly stick to the inner circumferential surface 91Aa. In this attaching structure of the display device 51, too, since the inner circumferential surface 91Aa of the packing 90A is pressed radially outwards by the outer circumferential surface 51a of the display device 51 but is not pressed in the inserting direction of the display device 51, that is, the direction of a center axis L2 of the packing 90A, the attaching position accuracy of the display device 51 in the inserting direction thereof can be increased high. The display device 51 is sealed up around an outer circumference thereof, whereby an image forming plane side (a side facing the interior of the light source case 61) of the display device 51 is tightly closed up.

High attaching position accuracy is required on a holder including semiconductor light emitting elements that constitute a light source of a projector. In positioning a fixing object member that requires such high attaching position accuracy in a compressing direction via a seal member, there occurs from time to time a case in which the fixing object member is not positioned properly due to the seal member being interposed, whereby desired attaching position accuracy cannot be obtained.

However, according to the present embodiment, the electronic device (the light source unit 60, the projector 10) includes the fixing target portions 62, 62A, which include the annular wall portions 622, 622A which constitute the wall portions having the dovetail-shaped engaging target portions 622a, 622Aa and to which the fixing object members (the holding plate 74, the display device 51) are fixed, and the dovetail-shaped engagement portions 92, 92A, which are brought into engagement with the dovetail-shaped engaging target portions 622a, 622Aa, respectively, and has the packings 90, 90A, constituting the closing members, in which the inner circumferential surfaces 91a, 91Aa are brought into abutment with the outer circumferential surfaces 74a, 51a of the holding plate 74 and the display device 51, respectively, while the outer circumferential surfaces 91b, 91Ab are brought into abutment with the inner circumferential surfaces 622d, 622Ad of the annular wall portions 622, 622A, respectively.

As a result, the packings 90, 90A are compressed by the outer circumferential surfaces of the holding plate 74 and the display device 51, whereby the holding plate 74 and the display device 51 are sealed up around the circumferences thereof. The holding plate 74 and the display device 51 do not compress the packings 90, 90A in the direction in which the holding plate 74 and the display device 51 are desired to be positioned, that is, in the inserting directions of the holding plate 74 and the display device 51, as a result of which the holding plate 74 and the display device 51 are prevented from bearing the repulsive forces generated by the packings 90, 90A. In addition, since the dovetail-shaped engaging target portions 622, 622A and the dovetail-shaped engagement portions 92, 92A constitute the dovetail joint, the problem is reduced in that the packings 90, 90A are twisted when the holding plate 74 and the display device 51 are inserted. Thus, with the light source unit 60, the holding plate 74 and the display device 51 can be attached with the high position accuracy while securing the closing properties. In addition, the dustproofness and waterproofness can be enhanced.

In addition, the fixing target portions 62, 62A have the sitting abutment portions 624, 624A which are brought into abutment with the holding plate 74 and the display device 51, respectively, in the center axis directions L1, L2 of the packings 90, 90A to thereby position the holding plate 74 and the display device 51 in the center axis directions L1, L2 of the packings 90, 90A. This enables the holding plate 74 and the display device 51 to be positioned in the inserting directions of the holding plate 74 and the display device 51 as a result of the holding plate 74 and the display device 51 being brought into abutment with the sitting abutment portions 624, 624A in the inserting directions thereof.

The inner circumferential surfaces 91a, 91Aa of the packings 90, 90A can be formed to have the arc-shaped cross sections, or the abutment projections, which protrude into the projecting configurations, can be provided on the inner circumferential surfaces 91a, 91Aa. As a result, the packings 90, 90A can gradually be compressed, whereby the occurrence of torsion in the packings 90, 90A can be reduced when the holding plate 74 and the display device 51 are inserted or assembled.

In addition, the fixing target portions 62, 62A have the packing restriction portions 623, 623A for restricting the packings 90, 90A from moving in the center axis directions L1, L2 thereof. As a result, the holding plate 74 and the display device 51 can be inserted while positioning the packings 90, 90A properly in an ensured fashion.

The widths W1 of the packings 90, 90A are smaller than the widths W2 of the annular wall portions 622, 622A. As a result, since the packings 90, 90A can be prevented from being compressed in the center axis directions L1, L2 of the packings 90, 90A by the holding plate 74 and the display device 51, the positioning accuracy of the packings 90, 90A in the center axis directions L1, L2 thereof can be enhanced.

The light source unit 60, which constitutes the electronic device, includes the fixing target portions 62, 62A in which the opening portions 621, 621A are formed. As a result, the light source unit 60 can be provided in which the positioning accuracy of the holding plate 74 and the display device 51 in the optical axis directions thereof is enhanced.

The projector 10, which constitutes the electronic device, has the display device 51, on to which light source light from the light source unit 60 is shined to form image light, the projection optical system 220 for projecting the image light emitted from the display device 51 on to the screen, and the projector control unit for controlling the display device 51 and the light source unit 60. As a result, the positioning accuracy of the holding plate 74 and the display device 51 in the optical axis directions thereof can be enhanced, whereby the projector 10 can be provided which can project a clear image.

The fabrication method of the projector 10, which constitutes the electronic device, has the first step in which the packings 90, 90A are attached to the fixing target portions 62, 62A, respectively, by bringing the dovetail-shaped engagement portions 92, 92A of the annular packings 90, 90A into abutment with the dovetail-shaped engaging target portions 622a, 622Aa of the fixing target portions 62, 62A, respectively, and the second step in which the holding plate 74 and the display device 51 are attached to the fixing target portions 62, 62A, respectively, by bringing the outer circumferential surfaces 74a, 51a of the holding plate 74 and the display device 51 into abutment with the inner circumferential surfaces 91a, 91Aa of the packings 90, 90A. As a result, the projector 10 can be fabricated in which the positioning accuracy of the holding plate 74 and the display device 51 in the optical axis directions thereof is enhanced.

The packings 90, 90A include the dovetail-shaped engagement portions 92, 92A which are brought into engagement with the dovetail-shaped engaging target portions 622a, 622Aa which are provided on the wall portions (the annular wall portions 622, 622A) of the fixing target portions 62, 62A to which the holding plate 74 and the display device 51, which constitute the fixing object members, are fixed. Then, the inner circumferential surfaces of the packings 90, 90A are brought into abutment with the outer circumferential surfaces of the holding plate 74 and the display device 51, while the outer circumferential surfaces of the packings 90, 90A are brought into abutment with the inner circumferential surfaces of the annular wall portions 622, 622A. As a result, the fixing object members can attached accordingly with the high position accuracy while securing the dustproofness inside the closing member.

In the embodiment that has been described heretofore, the fixing target portion is described as including the dovetail-shaped engaging target portion, and the dovetail-shaped engagement portion is described as being provided on the outer circumferential surface of the packing. However, the present invention is not limited to this configuration, and hence, for example, the dovetail-shaped engaging target portion may take other configurations including a recessed portion-like configuration, and the dovetail-shaped engagement portion may take other configurations including a projecting portion-like configuration. In the case that the engagement portion has the projecting portion-like configuration, the engagement portion may be provided not on the outer circumferential surface of the closing member but on a side surface thereof that faces the fixing target portion.

While the embodiment of the present invention has been described heretofore, the embodiment is presented as an example, and hence, there is no intention to limit the scope of the present invention by the embodiment. The novel embodiment can be carried out in other various forms, and various omissions, replacements and modifications can be made thereto without departing from the spirit and scope of the present invention. Those resulting embodiments and their modifications are included in the scope and gist of the present invention and are also included in the scope of inventions claimed for patent under claims below and their equivalents.

What is claimed is:

1. A projector comprising:
   a light source unit;
   a display device configured to emit image light corresponding to light from the light source unit; and
   a projection optical system configured to project the image light emitted from the display device on to an object;
   wherein the light source unit includes:
   a light source;
   a fixing object member holding the light source;
   a case including a fixing target portion comprising a wall portion having a dovetail-shaped engaging target portion and to which the fixing object member is fixed; and
   a closing member comprising a dovetail-shaped engagement portion configured to be brought into engagement with the dovetail-shaped engaging target portion and in which an inner circumferential surface thereof is brought into abutment with an outer circumferential surface of the fixing object member and an outer circumferential surface thereof is brought into abutment with an inner circumferential surface of the wall portion.

2. The projector according to claim 1,
   wherein the fixing target portion has a sitting abutment portion configured to be brought into abutment with the fixing object member in a center axis direction of the closing member to thereby position the closing member in the center axis direction.

3. The projector according to claim 1,
   wherein the inner circumferential surface of the closing member has an arc-shaped cross section.

4. The projector according to claim 2,
   wherein the inner circumferential surface of the closing member has an arc-shaped cross section.

5. The projector according to claim 1,
   wherein the inner circumferential surface of the closing member has an abutment projection protruding from the inner circumferential surface to thereby be brought into abutment with the outer circumferential surface of the fixing object member.

6. The projector according to claim 2,
   wherein the inner circumferential surface of the closing member has an abutment projection protruding from the inner circumferential surface to thereby be brought into abutment with the outer circumferential surface of the fixing object member.

7. The projector according to claim 3,
   wherein the inner circumferential surface of the closing member has an abutment projection protruding from the inner circumferential surface to thereby be brought into abutment with the outer circumferential surface of the fixing object member.

8. The projector according to claim 4,
   wherein the inner circumferential surface of the closing member has an abutment projection protruding from the inner circumferential surface to thereby be brought into abutment with the outer circumferential surface of the fixing object member.

9. The projector according to claim 1,
   wherein the fixing target portion has a packing restriction portion configured to restrict the closing member from moving in the center axis direction.

10. The projector according to claim 2,
    wherein the fixing target portion has a packing restriction portion configured to restrict the closing member from moving in the center axis direction.

11. The projector according to claim 3,
wherein the fixing target portion has a packing restriction portion configured to restrict the closing member from moving in the center axis direction.

12. The projector according to claim 5,
wherein the fixing target portion has a packing restriction portion configured to restrict the closing member from moving in the center axis direction.

13. The projector according to claim 1,
wherein a width of the closing member is smaller than a width of the wall portion.

14. The projector according to claim 2,
wherein a width of the closing member is smaller than a width of the wall portion.

15. The projector according to claim 3,
wherein a width of the closing member is smaller than a width of the wall portion.

16. The projector
according to claim 1,
wherein the light source unit further includes a light source case having an opening portion formed in a fixing position, and
wherein the fixing object member is a holding plate for holding the light source.

17. A light source unit comprising:
a fixing object member;
a case including a fixing target portion comprising a wall portion having a dovetail-shaped engaging target portion and to which the fixing object member is fixed; and
a closing member comprising a dovetail-shaped engagement portion configured to be brought into engagement with the dovetail-shaped engaging target portion and in which an inner circumferential surface thereof is brought into abutment with an outer circumferential surface of the fixing object member and an outer circumferential surface thereof is brought into abutment with an inner circumferential surface of the wall portion,
wherein the fixing target portion has a sitting abutment portion configured to be brought into abutment with the fixing object member in a center axis direction of the closing member to thereby position the closing member in the center axis direction,
wherein the fixing target portion is provided on a light source case having an opening portion formed in a fixing position, and
wherein the fixing object member is a holding plate for holding a light source.

18. The projector according to claim 1, further comprising:
a projector control unit configured to control the display device and the light source unit.

19. A projector fabrication method comprising:
a first step of attaching a closing member to a fixing target portion of a case by bringing a dovetail-shaped engagement portion of the closing member into engagement with a dovetail-shaped engaging target portion; and
a second step of attaching a fixing object member to the fixing target portion by bringing an outer circumferential surfaced of the fixing object member into abutment with an inner circumferential surface of the closing member,
wherein the projector comprises:
a display device configured to emit image light corresponding to light from a light source unit; and
a projection optical system configured to project the image light emitted from the display device on to an object.

20. An electronic device comprising:
a fixing object member;
a case including a fixing target portion comprising a wall portion having a dovetail-shaped engaging target portion and to which the fixing object member is fixed; and
a closing member comprising a dovetail-shaped engagement portion configured to be brought into engagement with the dovetail-shaped engaging target portion and in which an inner circumferential surface thereof is brought into abutment with an outer circumferential surface of the fixing object member and an outer circumferential surface thereof is brought into abutment with an inner circumferential surface of the wall portion,
wherein the fixing target portion has a sitting abutment portion configured to be brought into abutment with the fixing object member in a center axis direction of the closing member to thereby position the closing member in the center axis direction.

21. The electronic device according to claim 20,
wherein the dovetail-shaped engagement portion of the closing member is provided to overlap the sitting abutment portion in the center axis direction.

22. An electronic device comprising:
a fixing object member;
a case including a fixing target portion comprising a wall portion having a dovetail-shaped engaging target portion and to which the fixing object member is fixed; and
a closing member comprising a dovetail-shaped engagement portion configured to be brought into engagement with the dovetail-shaped engaging target portion and in which an inner circumferential surface thereof is brought into abutment with an outer circumferential surface of the fixing object member and an outer circumferential surface thereof is brought into abutment with an inner circumferential surface of the wall portion,
wherein the fixing target portion has a packing restriction portion configured to restrict the closing member from moving in the center axis direction.

23. The electronic device according to claim 22,
wherein the dovetail-shaped engagement portion of the closing member is provided to overlap the packing restriction portion in the center axis direction.

* * * * *